Sept. 20, 1971　　J. A. VICHNESS ET AL　　3,605,136
POWERED LITTER RACK

Filed Oct. 27, 1969　　　　　　　　　　　　2 Sheets-Sheet 1

INVENTORS,
Jules A. Vichness
Richard E. Lane
BY: Harry M. Saragovitz,
Edward J. Kelly & Herbert Berl
Attorneys.

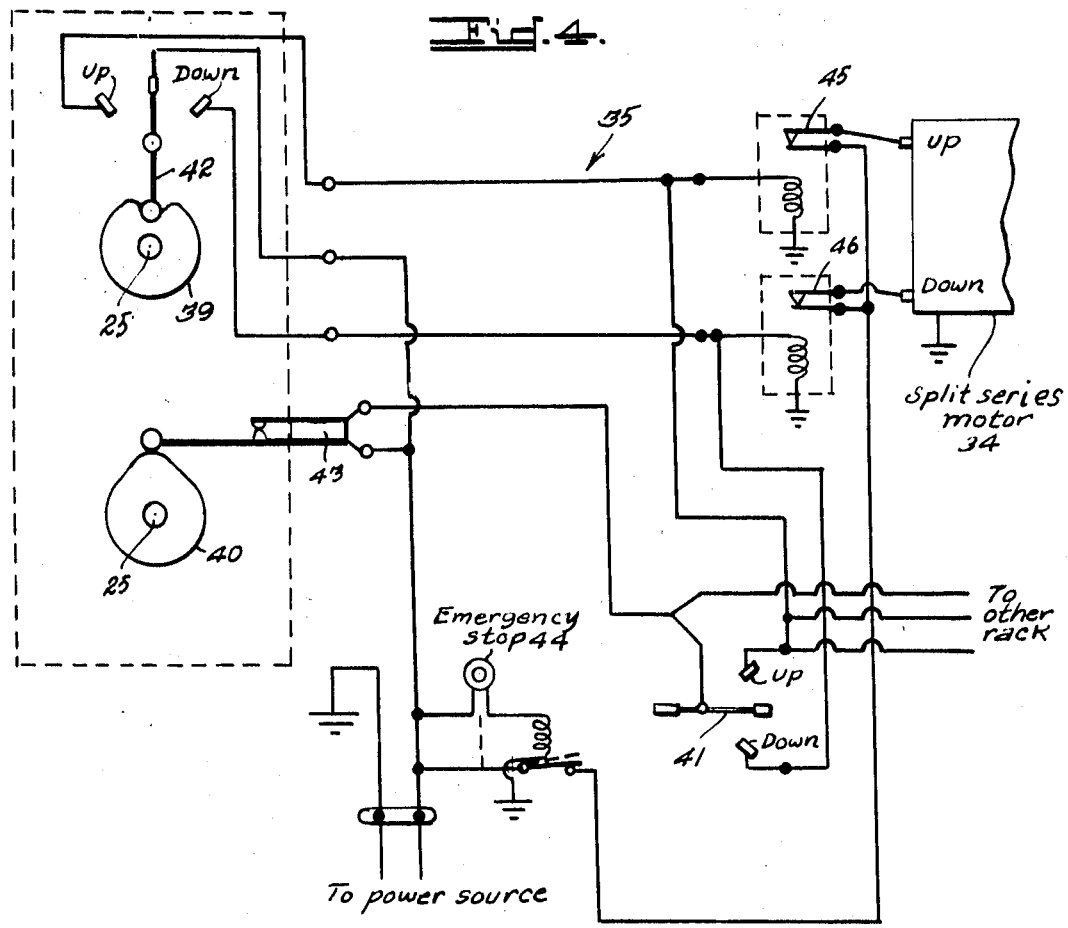

United States Patent Office 3,605,136
Patented Sept. 20, 1971

3,605,136
POWERED LITTER RACK
Jules A. Vichness, Newport News, and Richard E. Lane, Williamsburg, Va., assignors to the United States of America as represented by the Secretary of the Army
Filed Oct. 27, 1969, Ser. No. 869,573
Int. Cl. A47c 17/40; A61g 7/00
U.S. Cl. 5—8
6 Claims

ABSTRACT OF THE DISCLOSURE

A powered litter rack for quickly loading wounded combat personnel in a helicopter with a minimum of effort. A pair of upright and spaced frames are provided each with a pair of powered, upright, endless chains to lift litters bearing the wounded into stacked arrangement in an aircraft. Electric motors drive the chains which have clamps to engage the litters for lifting. A pair of rails fixed to the racks receive the legs of a litter in position for engagement with the clamps.

---

The invention described herein may be manufactured, used, and licensed by or for the Government for governmental purposes without the payment to us of any royalty thereon.

This invention relates to a powered litter rack and more particularly to a device for quickly loading wounded personnel in stacked relation in a helicopter or other hospital type carrier.

In combat zones wounded personnel have to be evacuated to a field hospital. This is often done under fire of combat and the operation has to be accomplished rapidly. In Vietnam, helicopters are often used as ambulances. The wounded must be placed on a litter and then lifted into the helicopter. They must then be carried to and placed on a bunk. This is time consuming and requires a maximum of medical attendants which usually would require two litter bearers on the ground plus two attendants on the aircraft. With the present invention, a single attendant could easily operate the loading rack and push it into place for transport while releasing the two litter bearers to pick up another wounded person.

Thus, three attendants instead of four can quickly load the wounded in the aircraft. Since each rack will accommodate at least three litters the task of arranging them in tiers in the aircraft would be approximately three times as fast.

Further the amount of handling the patients is greatly reduced since once placed on a litter they will not be handled until their arrival at the field hospital. It is well known that handling of wounded is hazardous, especially in case of broken bones and possible internal injuries.

It is therefore a principal object of this invention to provide a powered litter rack for stacking wounded personnel in an aircraft for transporting them to a field hospital without the necessity of removing the wounded from a litter and placing them on a bunk in the aircraft.

It is another object to speed up the loading of wounded in an aircraft and with a minimum of personnel.

Still another object is to minimize the physical handling of wounded during the loading operation to prevent further injury.

In the drawings.

Referring now to the drawings in which like reference numerals designate like parts throughout the several views of the drawings.

Figure 1:
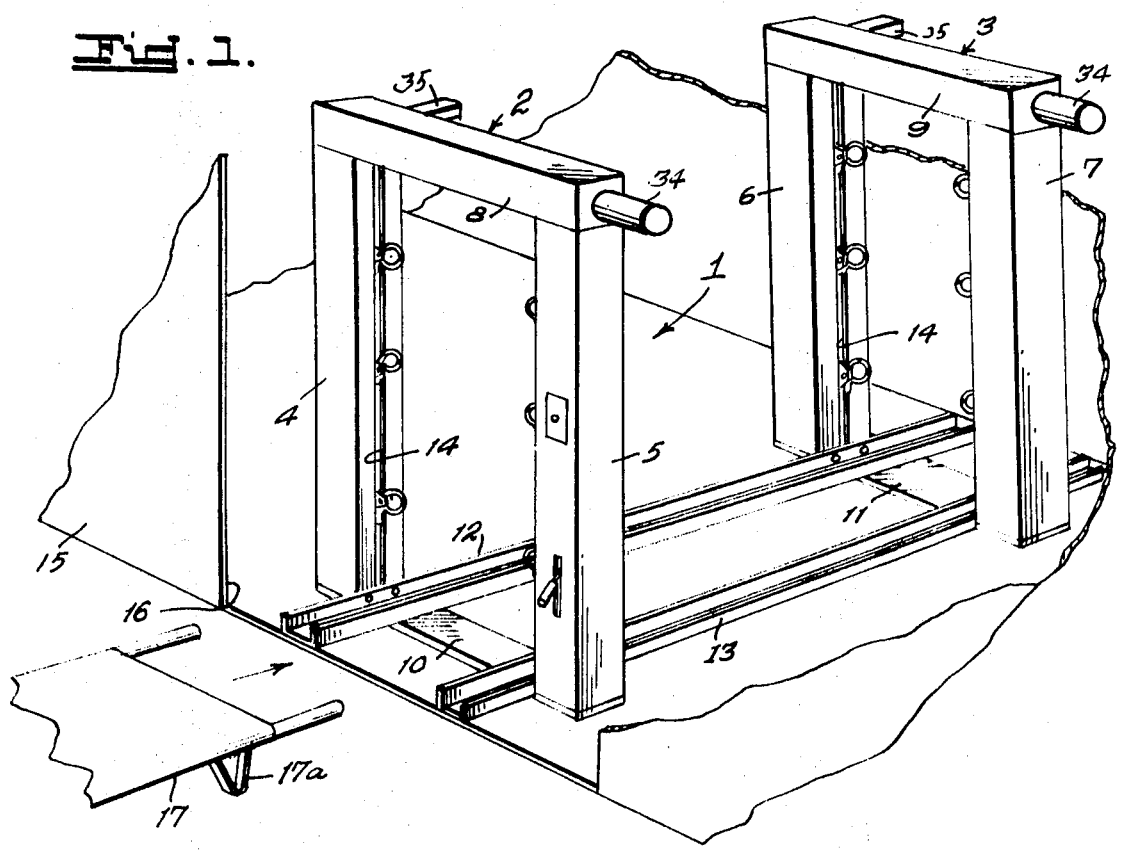
FIG. 1 is a perspective view of the powered litter rack of the invention and showing a portion of the fuselage of an aircraft in which it is mounted.

Reference character 1 indicates generally the powered litter rack of the invention. Rack 1 comprises a pair of frames indicated generally by 2 and 3, each being identical in construction. Each frame is composed of a pair of uprights 4 and 5 at one end and 6 and 7 being at the other end. Uprights 4, 5, 6 and 7 are braced by cross members 8 and 9 at their tops and by plates 10 and 11 at their bottoms, as shown in FIG. 1. A pair of tracks 12 and 13 fixed to uprights 4, 5, 6 and 7 and to plates 10 and 11 complete the structure of rack 1. Each rack is provided on its inner side with a slot 14 for passage of litter engaging hooks to be later described.

Rack 1 is shown in FIG. 1, as resting on the floor of the fuselage of an aircraft 15, a portion of which is shown, and is positioned transversely thereon and facing the door 16 thereof for easy loading of the litter 17.

Frames 2 and 3 and cross members 8 and 9 act also as housings for containing and supporting the operating mechanisms of the litter rack as well as forming a structure. Each frame 2 and 3 contain mechanisms that are identical, thence only one mechanism need be described and shown and each is indicated generally by 18.

Figure 2:
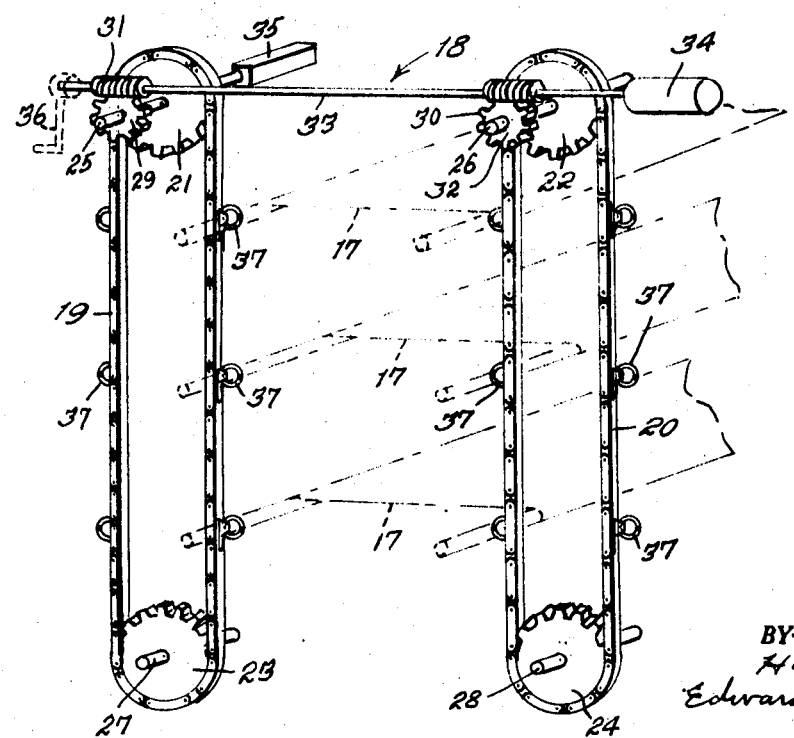
FIG. 2 is a perspective view of one pair of the identical chain drives, the frames being removed for sake of clarity.
Figure 3:
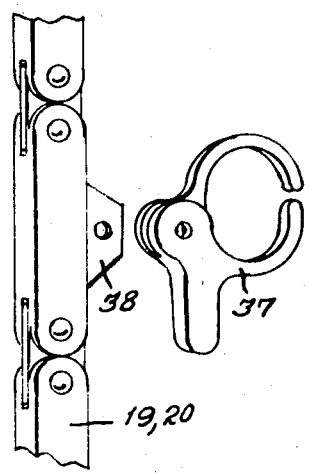
FIG. 3 is a perspective view of one type of litter hook used for engagement with the handles of a litter, and, FIG. 4 is a view of the wiring diagram of the circuit diagram of the programming timer.

Each mechanism 18 consists of a pair of endless chains 19 and 20 which are spaced apart as shown and the frames 2 and 3 removed for sake of clarity. Chains 19 and 20 travel on a pair of upper sprockets 21 and 22 and a pair of lower sprockets 23 and 24. Upper sprockets 21 and 22 are mounted on shafts 25 and 26 while lower sprockets 23 and 24 are mounted on shafts 27 and 28. Shafts 25, 26, 27, 27 and 28 will be journaled in uprights 4 and 5. Each shaft 25 and 26 carries a spur gear 29 and 30, respectively. A pair of worm gears 31 and 32 mesh with spur gears 29 and 30, respectively, and are mounted on a transverse shaft 33 which is driven at one end by an electric motor 34. Shaft 33 will be journaled in cross member 8 and shaft 33 drives a programming timer 35 at its other end for cycling the mechanism, to positions for engagement of litters 17. In case of power failure, breakdown of electrical components, etc., the chain drives may be operated manually by a crank 36, as shown in FIG. 2. Means are provided for engaging the handles of litters 17 to lift them in the rack 1 and may, as an example, comprise a conventional clamp and hook 37 which will be attached to chains 19 and 20 by lugs 38 which are spaced at intervals for the litters as shown.

Means are provided for automatically positioning clamps 37 to a height for receiving the handles of the litters 17 and this is accomplished by the programming timer 35, the electrical wiring diagram thereof being shown in FIG. 4. Briefly, the switch 35 comprises a pair of cams 39 and 40 carried by sprocket shaft 25. An up and down switch is indicated by 41. A switch 42 is operated by cam 39 and a make and break switch 43 is operated by cam 40. Switches 40, 41 and 42 are in circuitry with motor 34, as shown. The motor 34 is operated by switch 41. One cycle of the cam 39 will move chains 19 and 20 approximately eighteen inches either up or down as desired for attachment of a liter 17 to clamps 37 and this cycle involves one complete rotation of cam 39.

When switch 41 is moved manually to its up position, cam 39 moves switch 42 to the up contact to energize motor 34 to rotate chains 19 and 20 to lift the litters 17 and cam 40 opens switch 43 disconnecting the switch while cam 39 is rotating. When one complete rotation of cam 39 is completed, switch 42 is opened to stop motor 34. To lower the litters 17, switch 41 is moved to down position and cam 39 engages the down contact to energize motor 34 and cam 40 opens switch 43. A safety switch 44 is provided to stop the mechanism at will. Switch 41 is electrically connected to the identical programming switch 35 in the other identical mechanism, so that both chain mechanisms are synchronously operated. Limit switches 45 and 46 limit the mechanism to two cycles up and two cycles down.

OPERATION

The operation of the litter rack 1 is easily accomplished by merely operating the up and down switch 41. The litters 17 which usually are provided with four legs 17a (one being shown, see FIG. 1) are lifted and the legs 17a are slid into tracks 12 and 13 and pushed onto the rack. The lowermost clamps 37, due to the programming switch 35 will be at the correct position for sliding the handles of litters 17 to engage in clamps 37. After the first litter 17 is placed, switch 41 is moved to the up position which energizes motor 34 to operate the mechanism 18 to cause chains 19 and 20 to lift the litter eighteen inches. Now the next litter 17 is placed in the racks and the operation repeated until the rack contains all the litters it can hold. The rack 1 will be pushed into place in the aircraft 15 and another rack will be placed at the door 16 for loading. As many racks can be filled as the aircraft has room for. While the racks can be placed laterally in the fuselage 15, they may also be placed longitudinally as well. Racks 1 being portable may be secured to the floor of the aircraft by fastening them to seat studs, etc., not shown.

It is apparent from the foregoing that a litter rack has been devised that can be operated by a single attendant and eliminates the need for litter bearers entering the aircraft to place the wounded in bunks, thus saving time in loading and unloading.

What is claimed is:

1. In combination with an ambulance type vehicle, a litter rack comprising, a pair of longitudinally spaced, identical frames, each said frame including a pair of laterally spaced uprights, a cross member fixed to the upper ends of each pair of uprights, a plate connecting the lower portion of said uprights, a track secured to the lower portion of said uprights, there being a slot in the inner face of each said upright, an upper and a lower idler shaft journaled in each said upright in a said frame, each said shaft being disposed in parallel relation with said track, a sprocket carried by each said shaft, a spur gear carried by each said upper shafts, an endless chain trained over each said upper and lower sprockets, a series of symmetrically spaced clamps carried by the outer side of each said chain and adapted to extend through said slots in said uprights for engagement with the handles of a litter, a driven shaft journaled in each said cross member and disposed normal to said upper idler shafts, a pair of worm gear carried by each said driven shaft, each worm gear being in mesh with a said spur gear, and electrically operated means connected to each said driven shaft for synchronously driving said mechanisms to elevate litters from said track into symmetrically tiered relation in said rack.

2. In combination with an ambulance including at least one litter rack for supporting a plurality of litters in symmetrically spaced, tiered relation thereon, said rack including a pair of longitudinally spaced uprights each upright having a slot in its inner face, a cross member at their upper ends and a pair of channel members fixed, one each, to the lower portion of each upright adapted to receive the legs of a litter slidably therein, an elevating mechanism housed in each said pair of uprights and said cross member for engagement with a litter through said slots, and electrically operated means connected to each said mechanism for synchronously driving said elevating mechanisms to lift a plurality of litters from said channel members into said tiered relation in said rack.

3. In combination with a litter including a pair of handles and a series of legs fixed to the lower side of said handles, means whereby a plurality of said litters maybe stacked in symmetrically spaced, vertical relation comprising a pair of longitudinally spaced uprights, a cross member connecting the upper ends of each pair of uprights, there being a slot in the inner face of each said upright, a pair of channel members fixed, one each, to the lower inside face of each said upright adapted to receive the legs of a said litter slidably therein, an identical elevating mechanism housed in each said pair of uprights and its respective cross member adapted to engage the handles of a said litter through said slot, and an electrically operated means connected to each said mechanism for synchronously driving said mechanisms whereby said litters are progressively lifted from said channel members.

4. A litter rack as set forth in claim 1 wherein said track comprises a pair of longitudinally arranged, channel shaped members fixed one each, to the lower inside portion of said uprights and being adapted to slidably receive the legs of a litter therein, each said channel shaped member extending a distance beyond the outer ends of said frames.

5. A litter rack as set forth in claim 1 wherein each of said electrically operated means for driving said mechanisms in a synchronous manner comprises a reversible motor in circuitry with an electric power source and being in driving connection with one of said elevating mechanisms, a first manually operated switch in circuitry with said motor and power source and movable between up and down terminals for energizing said motor, a first cam rotated by said mechanism, a second switch in circuitry switch in circuiting between said motor and power source and movable by said first cam between up and down terminals, a second cam rotated by said mechanism, and a make and break switch in circuitry between said first manually operated switch and power source, whereby when manually operated switch is moved to contact a selected up and down terminal to energize said motor to move said mechanism in a selected direction, said second cam will rotate to open said make and break switch during a full revolution thereof to open said manually operated switch, said first cam establishing electrical contact between said motor and said second switch through a complete revolution thereof to insure a complete cycle of operation of said mechanism in said selected direction.

6. An electric system as set forth in claim 5 wherein each said electrically operated means is electrically connected to the other whereby said means operate said mechanisms in unison.

References Cited

UNITED STATES PATENTS 2,984,531   5/1961   Woltens et al. _____ 312—267
3,358,300   12/1967   Smith _____ 5—9

CASMIR A. NUNBERG, Primary Examiner

U.S. Cl. X.R.

5—9, 63; 296—19; 312—2667